(12) United States Patent
Green et al.

(10) Patent No.: US 7,386,980 B2
(45) Date of Patent: Jun. 17, 2008

(54) COMBUSTION LINER WITH ENHANCED HEAT TRANSFER

(75) Inventors: Andrew Green, Jupiter, FL (US); Peter Stuttaford, Jupiter, FL (US); John Carella, Jupiter, FL (US); Vamsi Duraibabu, Jupiter, FL (US); Stephen Jennings, Palm City, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 576 days.

(21) Appl. No.: 10/906,074

(22) Filed: Feb. 2, 2005

(65) Prior Publication Data

US 2006/0168965 A1 Aug. 3, 2006

(51) Int. Cl.
*F02C 1/00* (2006.01)
*F02G 3/00* (2006.01)

(52) U.S. Cl. .......................................... 60/752; 60/772

(58) Field of Classification Search ........... 60/752–760
See application file for complete search history.

(56) References Cited

U.S. PATENT DOCUMENTS

| | | | | |
|---|---|---|---|---|
| 3,349,558 A | * | 10/1967 | Smith | 60/754 |
| 4,195,475 A | * | 4/1980 | Verdouw | 60/754 |
| 4,695,247 A | * | 9/1987 | Enzaki et al. | 431/352 |
| 4,744,412 A | | 5/1988 | Kim et al. | |
| 4,790,140 A | * | 12/1988 | Sato et al. | 60/757 |
| 5,329,773 A | * | 7/1994 | Myers et al. | 60/759 |
| 5,337,568 A | * | 8/1994 | Lee et al. | 60/755 |
| 5,653,110 A | * | 8/1997 | Lee et al. | 60/756 |
| 5,802,841 A | * | 9/1998 | Maeda | 60/784 |
| 6,098,397 A | * | 8/2000 | Glezer et al. | 60/772 |
| 6,134,877 A | * | 10/2000 | Alkabie | 60/800 |
| 6,279,323 B1 | * | 8/2001 | Monty et al. | 60/752 |
| 6,526,756 B2 | | 3/2003 | Johnson et al. | |
| 6,530,225 B1 | * | 3/2003 | Hadder | 60/772 |
| 6,546,730 B2 | * | 4/2003 | Johnson et al. | 60/752 |
| 6,675,582 B2 | * | 1/2004 | Monty et al. | 60/752 |
| 6,681,578 B1 | * | 1/2004 | Bunker | 60/772 |
| 6,722,134 B2 | * | 4/2004 | Bunker | 60/752 |
| 6,760,972 B2 | * | 7/2004 | Zifferer | 29/890.053 |
| 6,857,275 B2 | * | 2/2005 | Pidcock et al. | 60/796 |
| 6,901,758 B2 | * | 6/2005 | Grady et al. | 60/752 |
| 6,938,424 B2 | * | 9/2005 | Tiemann | 60/752 |
| 7,104,067 B2 | * | 9/2006 | Bunker | 60/752 |
| 2004/0079082 A1 | * | 4/2004 | Bunker | 60/752 |
| 2005/0044857 A1 | * | 3/2005 | Glezer et al. | 60/772 |
| 2005/0262845 A1 | * | 12/2005 | Martling et al. | 60/752 |
| 2006/0042255 A1 | * | 3/2006 | Bunker et al. | 60/752 |

\* cited by examiner

*Primary Examiner*—William H Rodríguez

(57) ABSTRACT

A combustion liner having enhanced heat transfer over at least a portion of the liner is disclosed. The combustion liner comprises, amongst other features, an outer surface wherein at least a region of the outer surface is textured in a substantially uniform pattern such that the surface area exposed to a passing cooling medium is increased, thereby increasing the heat transfer through the combustion liner. Multiple embodiments of textured patterns are also disclosed.

19 Claims, 3 Drawing Sheets

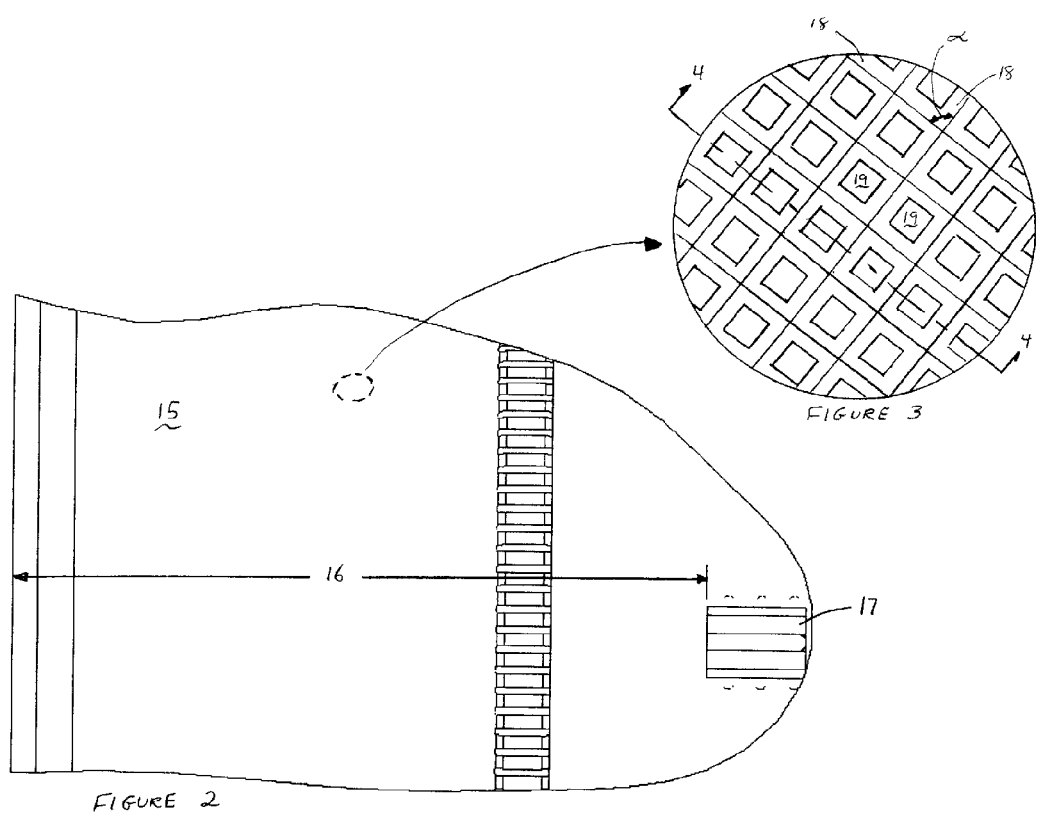

COMBUSTION LINER WITH ENHANCED HEAT TRANSFER

BACKGROUND OF THE INVENTION

The present invention relates generally to gas turbine combustion liners and more specifically to a manner in which to improve the heat transfer through the combustion liner.

Gas turbine engines are a well-established form of technology capable of mechanical output in the form of propulsive thrust or shaft power for electrical generation. Gas turbine engines are well known in aircraft and power generation applications. A typical gas turbine engine comprises at least a compressor, a combustion system, and a turbine, which is coupled to the compressor. Depending on the power output required, the combustion system can comprise a single combustor or a plurality of combustors.

Within a gas turbine combustor, fuel is mixed with compressed air and introduced to an ignition source upon which combustion occurs, producing hot combustion gases that are directed to drive the turbine. This reaction of the fuel and compressed air mixture typically occurs in a combustion liner that is fabricated from high temperature capable material. However, material selection alone is not sufficient to maintain component life in the harsh combustion environment. Combustion liners also require thermal protection and dedicated cooling in order to maintain structural integrity during operation. With respect to thermal protection issues, this is typically accomplished by applying a thermal barrier coating to the inner surface of the combustion liner, that which is directly exposed to the combustion process. Typical thermal barrier coatings comprise a bond coat applied directly to the metal substrate and a top ceramic coat applied over the bond coat. An example of this type of coating is a well known and commercially available air plasma spray McrAlY bond coat followed by and air plasma sprayed Yttria Stabilized Zirconia (YSZ) Top Coat, where M is typically selected from a group comprising CoNi, NiCo, or Ni. Bond coat and top coat thickness will vary depending on the application. However, for a McrAly bond coat of 0.003"-0.005" thick and Yttria Stabilized Zirconia top coat of 0.012"-0.018" thick, the combustion liner manufacturer can estimate approximately a 100 degree F. benefit due to the coating, which is strongly dependent on thermal gradients. While coating a combustion liner provides some thermal benefits, it is not the only feature required to maintain structural integrity and component life of the combustion liner.

Another feature commonly used in combustion liners for accommodating the high operating temperatures is cooling schemes. More particularly, the placement of compressor discharge air not used in the combustion process, but instead used to cool the walls of the combustion liner. Compressed air can cool the combustion liner walls in a variety of manners including impingement cooling of the liner wall, being laid along the liner wall as a film of cooling air, and being directed through the combustion liner walls through elongated holes to cool throughout the material thickness as effusion cooling. The compressed air serves to provide a layer of air along the liner wall or throughout the liner wall that helps to reduce its effective operating temperature, so as to not exceed material capabilities.

Yet another manner in which combustion liners are protected from the harsh environment in which they operate is to augment the heat transfer through the combustion liner wall. This has been accomplished in the prior art by adding a coating to the liner wall backside such that cooling air passing over the outside of the liner wall is turbulated and heat transfer efficiency improved. An example of this type of heat transfer arrangement is disclosed in U.S. Pat. Nos. 6,526,756 and 6,546,730, hereby incorporated by reference. While this type of heat transfer augmentation is an improvement, it does not necessarily provide a uniform heat transfer improvement across all coated surfaces nor is a coating type heat transfer augmentation device preferable around cooling holes due to the processing requirements necessary to maintain open cooling holes and properly sized cooling holes.

What is needed is a means for augmenting the heat transfer across a combustion liner that provides uniform heat transfer across the entire selected area as well as a means that has little to no impact on other combustion liner cooling such as cooling hole definition and processing.

SUMMARY OF THE INVENTION

A combustion liner for a gas turbine combustor is disclosed having enhanced heat transfer capabilities. The combustion liner comprises a first end, a second end, a generally annular wall about a centerline, with the annular wall having an inner surface and an outer surface. Fixed to the liner outer surface is a plurality of attachment points for fixing the liner within the combustor. A region of the liner outer surface from proximate the first end to proximate the attachment points is textured in a substantially uniform pattern. This uniform pattern preferably comprises a plurality of intersecting grooves formed in the liner outer surface, which increases the liner wall surface area, and for a given amount of cooling fluid passing over the liner outer surface, heat transfer is improved. Various embodiments are disclosed with respect to the substantially uniform pattern and cooling fluid passing over the liner outer surface.

BRIEF DESCRIPTION OF THE DRAWINGS

FIG. 2 is a side view of a portion of a combustion liner in accordance with the preferred embodiment of the present invention.

FIG. 3 is a detailed view of a portion of a combustion liner outer surface in accordance with the preferred embodiment of the present invention.

DETAILED DESCRIPTION OF THE PREFERRED EMBODIMENT

Figure 1:
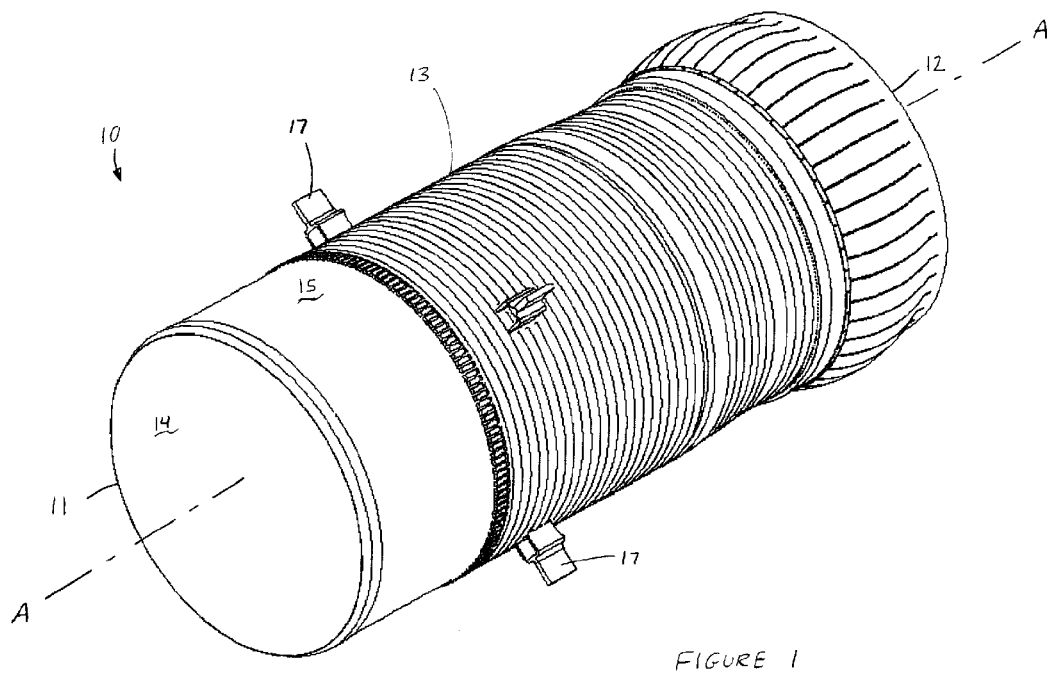
FIG. 1 is a perspective view of a combustion liner in accordance with the preferred embodiment of the present invention.

The present invention will now be described in detail with reference to FIGS. 1-4B. Referring now to FIG. 1, a combustion liner 10 is shown in perspective view having enhanced heat transfer capabilities. Combustion liner 10 comprises first end 11, second end 12, and generally annular wall 13 about centerline A-A. Generally annular wall 13 further comprises inner surface 14, outer surface 15, and a thickness therebetween. Fixed to outer surface 15 at a first distance 16 from first end 11 is a plurality of liner stops 17. The positioning of the liner stops 17 is more clearly shown in FIG. 2. As one skilled in the art understands, liner stops 17 are distinct bracket-like components that serve as attachment points for securing the combustion liner 10 within a mating component of a combustor. As it can be seen from FIGS. 1 and 2, the plurality of liner stops 17 extend radially outward from the outer surface 15 and have a length and width that extend along the outer surface 15. To facilitate and enhance heat transfer along the forward end of combustion liner 10, a region of outer surface 15 from proximate first end 11 to proximate the liner stops 17 is textured in a substantially uniform pattern. A portion of the preferred embodiment of this textured pattern is shown in FIG. 3.

Figure 4A:
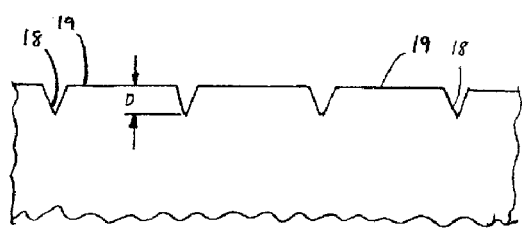
FIG. 4A is a cross section view taken through FIG. 3 in accordance with the preferred embodiment of the present invention.
Figure 4B:
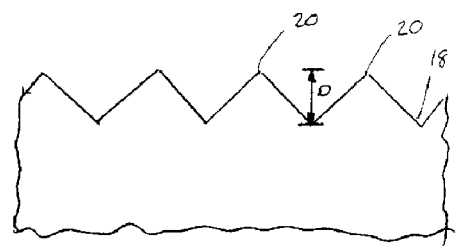
FIG. 4B is a cross section view of an alternate embodiment of the present invention.

The textured pattern of FIG. 3 is shown in greater detail in FIGS. 4A and 4B, which disclose multiple embodiments in cross section of the textured pattern. With reference back to FIG. 3, in general, the textured pattern comprises a plurality of intersecting grooves 18 that form an angle α therebetween. In the preferred embodiment of the present invention, angle α ranges between 30 degrees and 60 degrees. Depending on the desired level of heat transfer enhancement, different textured patterns can be incorporated into liner outer surface 15. More specifically, various amounts of liner outer surface 15 can be left intact and not textured. For example, FIGS. 3 and 4A disclose a textured pattern wherein flat portions 19 remain along outer surface 15 opposite of grooves 18. If additional heat transfer is desired above that of the preferred embodiment having flat portions 19, the entire outer surface 15 can be textured as shown in cross section in FIG. 4B. In this embodiment, the substantially uniform pattern contains peak portions 20 along outer surface 15 opposite of grooves 18. For either of these embodiments, it is preferred that grooves 18 extend to a depth D of up to 0.010 inches from outer surface 15 of combustion liner 10. Axial spacing between grooves 18 is dependent upon the desired level of heat transfer.

A variety of techniques can be used to incorporate a substantially uniform textured pattern into a combustion liner. This pattern can either being formed into the liner outer surface by applying a pressure to a tool having said pattern and directing the tool along the liner outer surface in a predetermined pattern. Alternately, the substantially uniform textured pattern can be incorporated into liner outer surface by cutting the pattern into the liner outer surface. The preferred process to use depends on a number of factors, including, but not limited to the textured pattern geometry, combustion liner diameter, combustion liner material, and manufacturing cost.

A combustion liner having an outer surface comprising a substantially uniform textured pattern as disclosed by the present invention, has greater heat transfer capability over other combustion liners of the prior art. This improved heat transfer is seen in operation when passing a cooling medium having a lower temperature than the combustion gases over the textured pattern. The substantially uniform textured pattern provides an increase in surface area along the combustion liner outer surface, such that when a cooling medium passes over the textured surface, additional surface area is cooled than would otherwise be exposed in a non-textured combustion liner. Furthermore, providing a substantially uniform pattern that is placed into a liner outer surface by close tolerance forming or machining results in more evenly distributed wall cooling and heat transfer compared to combustion liners of the prior art. Depending on the type of combustion occurring in combustion liner 10, or the engine operating conditions, the cooling medium passing over the combustion liner outer surface can vary, but is preferably selected from the group comprising compressed air, a fuel-air premixture, and steam, and has a temperature lower than the combustion gases contained within the combustion liner.

In addition to the increased surface area, the textured pattern creates a rough surface that increases the turbulence to the cooling medium passing over the liner outer surface, thereby resulting in increased heat transfer across the combustion liner. However, while the textured outer surface of the liner is advantageous for heat transfer, the texture must be sufficient for heat transfer purposes without being great enough that a flame would attach to the textured surface should a flashback occur. Depending on the fuel injection locations and whether or not fuel is contained in the cooling medium, the height of the textured surface is especially important, such that if a flashback does occur, the flame does not anchor on the textured surface and is supplied with a fuel source from the cooling medium.

While the invention has been described in what is known as presently the preferred embodiment, it is to be understood that the invention is not to be limited to the disclosed embodiment but, on the contrary, is intended to cover various modifications and equivalent arrangements within the scope of the following claims.

What is claimed is:

1. A combustion liner having enhanced heat transfer capabilities, said liner comprising:
   a first end, a second end, and a generally annular wall about a centerline, said generally annular wall having an inner surface, and an outer surface, thereby establishing a thickness therebetween;
   a plurality of liner stops fixed to said outer surface at a first distance from a said first end, said liner stops having a length and a width and extend radially outward from said outer surface; and,
   wherein at least a region of said outer surface from proximate said first end to proximate said liner stops is textured, where said region has a substantially uniform pattern comprising a plurality of intersecting grooves located in said outer surface of said generally annular wall and having an angle therebetween with each groove also having a depth extending into said thickness.

2. The combustion liner of claim 1 wherein said angle ranges between 30 degrees and 60 degrees.

3. The combustion liner of claim 1 wherein said depth extends up to 0.010 inches from said outer surface.

4. The combustion liner of claim 1 wherein said substantially uniform pattern contains flat portions along said outer surface opposite said grooves.

5. The combustion liner of claim 1 wherein said substantially uniform pattern contains peak portions along said outer surface opposite said grooves.

6. The combustion liner of claim 1 wherein said pattern is incorporated into said outer surface by applying a pressure to a tool having said pattern and directing said tool across said liner outer surface.

7. The combustion liner of claim 1 wherein said pattern is incorporated into said outer surface by cutting said pattern into said liner outer surface.

8. The combustion liner of claim 1 wherein a cooling medium passes over said textured pattern on said outer surface, said cooling medium having a lower temperature than combustion gases passing through said liner.

9. The combustion liner of claim 8 wherein said cooling medium is selected from the group comprising compressed air, fuel, fuel-air premixture, and steam.

10. A combustion liner having enhanced heat transfer capabilities, said liner comprising:

a first end, a second end, and a generally annular wall about a centerline, said generally annular wall having an inner surface, and an outer surface, thereby establishing a thickness therebetween;

a plurality of liner stops fixed to said outer surface at a first distance from said first end, said liner stops having a length and a width and extend radially outward from said outer surface; and, wherein at least a region of said outer surface from proximate said first end to proximate said liner stops is textured in a substantially uniform pattern, said pattern comprising a plurality of intersecting grooves that form an angle therebetween with the plurality of intersecting grooves extending only partially into said thickness such that said inner surface maintains a generally annular shape.

11. The combustion liner of claim 10 wherein said angle ranges between 30 degrees and 60 degrees.

12. The combustion liner of claim 11 wherein said grooves extend to a depth of up to 0.010 inches from said outer surface into said thickness.

13. The combustion liner of claim 12 wherein said substantially uniform pattern contains flat portions along said outer surface opposite said grooves.

14. The combustion liner of claim 12 wherein said substantially uniform pattern contains peak portions along said outer surface opposite said grooves.

15. The combustion liner of claim 10 wherein said pattern is incorporated into said outer surface by applying a pressure to a tool having said pattern and directing said tool across said liner outer surface.

16. The combustion liner of claim 10 wherein said pattern is incorporated into said outer surface by cutting said pattern into said liner outer surface.

17. The combustion liner of claim 10 wherein a cooling medium passes over said textured pattern on said outer surface, said cooling medium having a lower temperature than combustion gases passing through said liner.

18. The combustion liner of claim 17 wherein said cooling medium is selected from the group comprising compressed air, fuel-air premixture, and steam.

19. A method of providing a combustion liner having enhanced heat transfer capabilities comprising the steps:

placing a substantially uniform pattern, in order to create a textured surface, into an outer surface of a combustion liner, said pattern comprising a plurality of intersecting grooves each having an angle therebetween and extending a depth into said outer surface and said combustion liner having a first end, a second end, and a generally annular wall about a centerline, said generally annular wall having, a thickness between an inner surface and said outer surface;

placing said combustion liner in a gas turbine engine and securing said combustion liner to a combustor by a plurality of liner stops located along said outer surface of said liner;

directing a flow of combustion gases through said combustion liner; and, directing a flow of a cooling medium over said outer surface and across said substantially uniform pattern, where said flow of cooling medium undergoes turbulence from said textured surface, thereby enhancing the cooling of said combustion liner.

* * * * *